(12) United States Patent
Schultz et al.

(10) Patent No.: US 6,371,491 B1
(45) Date of Patent: Apr. 16, 2002

(54) PIPE FITTING GASKET HAVING ENHANCED SURFACE PROPERTIES

(75) Inventors: Charles W. Schultz, Easton, PA (US); Lawrence W. Thau, Jr., Flemington, NJ (US)

(73) Assignee: Victaulic Company of America, Easton, PA (US)

(*) Notice: Subject to any disclaimer, the term of this patent is extended or adjusted under 35 U.S.C. 154(b) by 0 days.

(21) Appl. No.: 09/399,834

(22) Filed: Sep. 21, 1999

(51) Int. Cl.⁷ ............................................... F16L 17/035
(52) U.S. Cl. ..................... 277/627; 277/652; 277/936; 285/112; 285/373
(58) Field of Search ................. 277/627, 650, 277/652, 935, 936, 938, 944; 285/112, 373

(56) References Cited

U.S. PATENT DOCUMENTS

| | | | |
|---|---|---|---|
| RE23,184 E | 12/1949 | Whitbeck | 252/18 |
| 3,129,812 A | 4/1964 | Deasy | 206/47 |
| 3,271,308 A | 9/1966 | Veit et al. | 252/13 |
| 3,622,653 A * | 11/1971 | Schuster et al. | |
| 3,654,744 A | 4/1972 | Smith | 53/22 |
| 3,785,841 A | 1/1974 | Beard | 106/186 |
| 3,941,393 A * | 3/1976 | Bainard | |
| 4,063,640 A | 12/1977 | Wilkinson | 206/231 |
| 4,319,924 A | 3/1982 | Collins, Jr. | 106/14.12 |
| 4,381,323 A | 4/1983 | Lowe et al. | 427/383.7 |
| 4,394,478 A | 7/1983 | Martin | 524/424 |
| 4,409,111 A * | 10/1983 | Holmes et al. | |
| 4,601,495 A * | 7/1986 | Webb | |
| 4,626,453 A | 12/1986 | Klotz et al. | 427/397.7 |
| 4,791,008 A | 12/1988 | Klotz et al | 427/397.7 |
| 4,808,323 A | 2/1989 | Fisher et al. | 252/15 |
| 4,808,478 A | 2/1989 | Dans et al. | 428/391 |
| 5,288,792 A | 2/1994 | Buxbaum | 252/25 |
| 5,342,655 A | 8/1994 | Roller et al. | 427/372.2 |
| 5,462,291 A * | 10/1995 | Maeda et al. | |
| 5,616,367 A | 4/1997 | Spearin et al. | 427/532 |
| 5,620,513 A | 4/1997 | Spearin et al. | 118/64 |
| 5,687,974 A | 11/1997 | Wilkinson et al. | 277/102 |
| 5,716,055 A | 2/1998 | Wilkinson et al. | 277/102 |
| 5,837,328 A | 11/1998 | Spearin et al. | 427/542 |
| 6,164,422 A * | 12/2000 | Sanitate et al. | |

* cited by examiner

Primary Examiner—Anthony Knight
Assistant Examiner—John L. Beres
(74) Attorney, Agent, or Firm—Abelman, Frayne & Schwab

(57) ABSTRACT

An elastomeric gasket for a pipe coupling having a dry lubricating film of an aqueous solution of a lubricant and a film-forming polymer adhered thereto.

10 Claims, 1 Drawing Sheet

PIPE FITTING GASKET HAVING ENHANCED SURFACE PROPERTIES

The present invention relates to a gasket having a dry lubricant and, more particularly, to an elastomeric gasket for use in any system using an elastomeric gasket, for example, pipe couplings. The benefits of the present invention may be beneficially applied to any system in which a dry lubricant can be used to assist gasket seating and emplacement.

BACKGROUND OF THE INVENTION

Numerous types of systems use gaskets to prevent leakage. For example, pipe couplings are known which are intended to economically and efficiently provide secure, leakproof connection at the juncture of a variety of pipe configurations. The particular coupling assembly selected naturally depends upon the type of pipes being connected, their routing, and their sizes, and the intended service for which they will be used.

Typical of such pipe couplings, in which the present invention has found particularly advantageous utilization, are the (i) groove pipe couplings as typically shown in the U.S. Pat. No. 4,601,495, (ii) the T couplings for branch pipes to be secured to a main pipe, as typically shown in U.S. Pat. No. 3,999,785, (iii) the cam actuated couplings, as typically shown in U.S. Pat. No. 4,165,892, and (iv) the boltless locking pin secured couplings as typically shown in U.S. Pat. No. 4,561,678, all of which are assigned to the assignee of the present invention and the disclosures of which are incorporated herein by reference.

While differing in construction and application, one common feature of all such couplings, as well as other coupling constructions to which the present invention is applicable, is the inclusion of a deformable gasket, which is typically constructed of an elastomeric compound, such as natural or synthetic rubber. The gasket is contained within a suitably configured recess and is employed to seal the pipes meeting at the coupling, to prevent leakage when the coupling is in an assembled condition.

Typically, when the various components of the coupling, including the gasket, are shipped to the installation site, the gasket is exposed to the environment. It has been found that during shipping, dust, or other contaminants, such as paint chipping off of the coupling segments, may stick to the gasket. At the site, the installer must then remove, clean, and lubricate the gasket during the process of installing the coupling joint onto the pipe.

In addition to the inefficiency of having to clean the gasket at the installation site, the polymeric water-based lubricants or the silicone-based lubricants which are currently applied to the gasket surfaces in the "wet state" at the installation site, tend to run, stain and, in general, leave an unsightly and unsafe residue. In many instances, the installer may either place a non-uniform or uneven quantity of lubricant, or even the wrong lubricant, on the gasket. This can ultimately result in leakage due to an improper gasket seal, as well as damaging the gasket and materially shortening its useful life. Safety can also be compromised by virtue of the slippery residue being transferred to tools, surfaces, and body parts.

Accordingly, it is an object of the present invention to provide a pipe coupling gasket having a dry lubricant in the form of a dry film bonded thereto.

It is another object of the present invention to minimize exposure of the gasket to oxidative effects by the encapsulating and permeability characteristics of the surface treatment.

It is a further object of the present invention to pre-lubricate an elastomeric gasket when it is manufactured by applying a lubricating film to its surfaces and which is in a dry condition during shipment and installation in a pipe coupling at a pipe assembly site.

It is still a further object of the present invention to provide an elastomeric gasket or seal, ready for installation in a pipe coupling, having pre-lubricated surfaces which are in a dry state.

It is yet a further object of the present invention to provide an elastomeric gasket or seal having a pre-lubricated dry surface which is colored or dyed to denote and verify the presence and coverage of the lubricant or its service rating.

These as well as other objects will become apparent upon review of the following drawing and detailed description which follows.

SUMMARY OF THE INVENTION

It has now been found that the problems associated with applying a paste or liquid gasket lubricant in the wet state at, for example, a pipe installation site, to insure an adequate seal can be overcome by applying an aqueous solution of a lubricant and a film-forming polymer evenly and uniformly to the surface of the elastomeric gasket after its manufacture. By this means, the gasket has a uniform lubricating film on its surface in the dried state which allows the gasket to be shipped and installed without being concerned about encountering the uncertainties and problems attendant to, and inherent in, the, application on-site of liquid lubricants. Furthermore, by applying the lubricant composition of the present invention in a uniform manner in accordance with the process of the present invention on the gasket surfaces, significant benefits are realized, viz., exposure of the gasket to oxidation is reduced, a tighter and more effective seal is achieved, the useful life of the gasket is extended, and workplace safety is significantly improved since the installers do not have to handle slippery and dangerous metal parts, as is the case when using conventional lubricants.

DETAILED DESCRIPTION OF THE INVENTION

The present invention provides an elastomeric gasket or seal, for use in sealing devices designed to make a pressure-tight joint between stationary parts to prevent the leakage of liquids and fluids, which has a dry lubricating film adhered to its surface.

The present invention finds particular application with respect to gaskets used in pipe couplings for grooved pipe. The solid, dry lubricating film provides continuous and uniform lubrication so that the coupling slides easily, gasket pinching is prevented and ready rotation of the coupling is facilitated.

Figure 1:
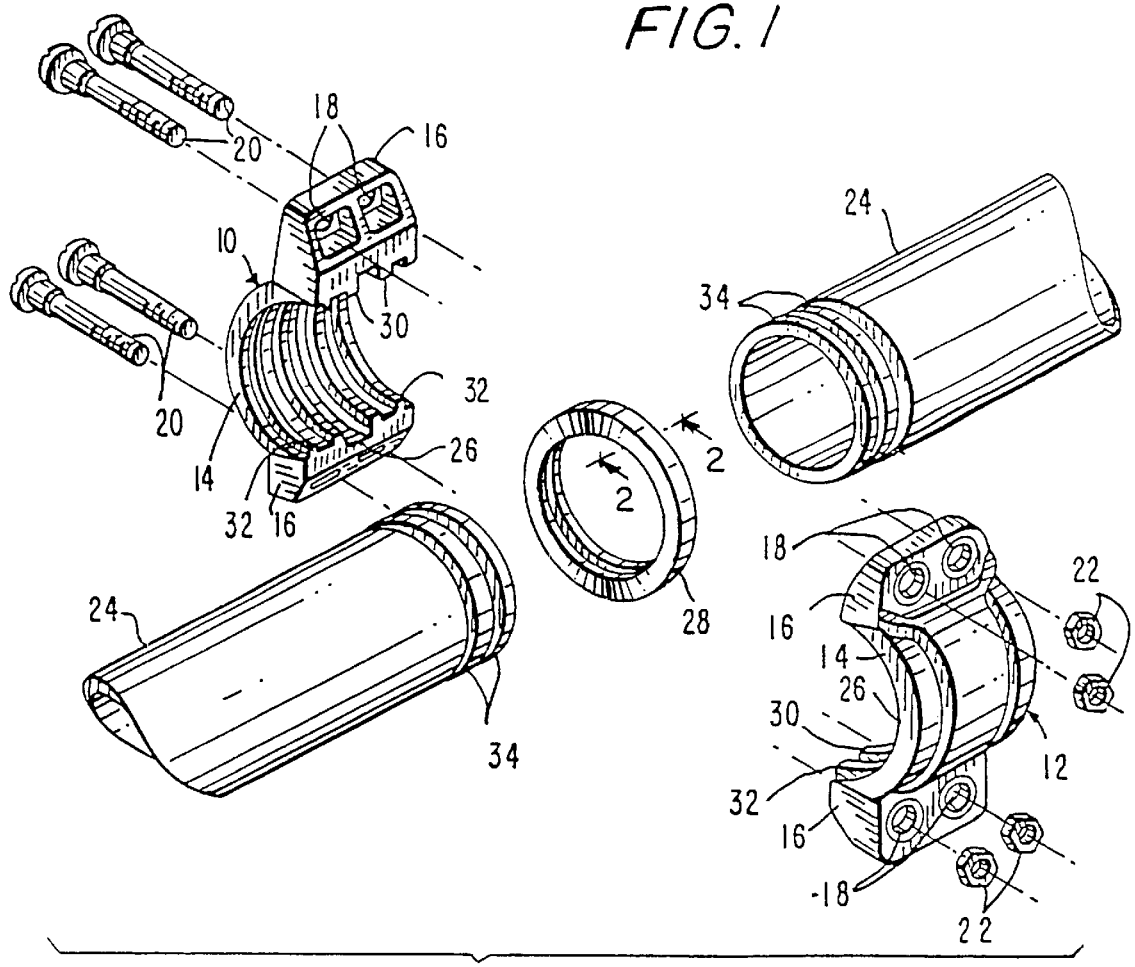
FIG. 1 is an exploded perspective view of one form of a segmented pipe coupling intended to utilize the gasket of the present invention.

Referring to FIG. 1, there is depicted one form of a segmented pipe coupling intended for grooved pipe and which includes the gasket of the present invention having a dry lubricant film adhered to its surface. This coupling is of the type which is the subject of the aforementioned U.S. Pat. No. 4,601,495.

The segmented coupling of FIG. 1 is illustrated in disassembled condition, with the respective coupling segments being indicated at 10 and 12. The coupling segments are identical with each other and are substantially semi-circular in form, each coupling member half being comprised by an arcuate body portion 14 which terminates at its ends in radially outwardly extending bolting pads 16 formed integrally with the body portion 14.

Each of the radially outwardly extending bolting pads 16 includes apertures 18 for the reception of fastening members, which, in the drawing, are shown as headed bolts 20. When in an assembled condition, the respective coupling segments 10 and 12 are secured to each other in encircling relationship with the pipe ends by the headed bolts 20 and conventional nuts or lock nuts 22 threadedly received on the bolts.

Internally of each coupling segment half 10 and 12 and intermediate the axial length thereof in the embodiment illustrated, is a recess 26 in which a gasket 28 is accommodated, having a dry lubricating film 29 bonded thereto in accordance with the present invention, the gasket 28 being employed to seal the pipes 24 when the coupling is in an assembled condition and prevent leakage.

Located immediately adjacent the recess 26 in each coupling segment is an axially inner key 30 formed integrally with the coupling segment, and, spaced from each of the axially inner keys 30 are axially outer keys 32, which similarly are formed integrally with the respective coupling segments. Although two keys 30 and 32 are shown in this embodiment, the invention may also be used in similar grooved pipe couplings intended for lower pressure applications which may include only a single key for each pipe.

The respective keys 30 and 32 are dimensioned, as later discussed, for them to be received within corresponding axially spaced annular grooves 34 formed in the respective pipes adjacent the ends thereof.

To install the segmented coupling, the ends of the pipes 24 are brought into proximity with each other with the gasket 28 in sealing relationship with the pipe ends. The respective coupling segments are positioned over the gasket 28 with the gasket contained within the recess 26, and the keys 30 and 32 are inserted into the annular grooves 34 in the respective pipe ends. The bolts 20 are then inserted through the aligned apertures 18 of the coupling segments, and the coupling segments are drawn towards each other by tightening the nuts 22 down on the bolts 20. This draws the respective coupling segments towards the pipes, and compresses the gasket 28 into intimate sealing contact with the respective pipe ends.

While the respective coupling segments may be formed by any known techniques, such as by pressing or drop-forging steel or any other suitable high-strength metal, the respective coupling segments are formed by close tolerance casting techniques from ductile iron or a similar high-strength metal.

While the segmented coupling illustrated in the drawing is comprised of only two coupling segments, it will be appreciated that the invention is equally applicable to segmented couplings comprising three or more coupling segments for use in conjunction with large diameter pipes. The use of multiple coupling segments facilitates the manual handling of the segments and the assembly of the coupling onto the pipes. Additionally, the formation of such large size segmented couplings from multiple coupling segments facilitates the forming of the respective coupling segments to closer tolerances than would be possible in the case of a large segmented coupling comprised of only two coupling segments.

Figure 2:
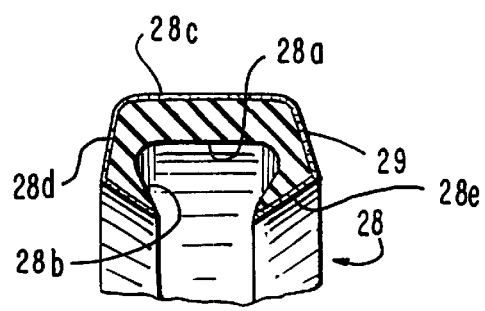
FIG. 2 is an enlarged sectional view taken along the line 2—2 of the gasket of FIG. 1.

As can be seen by reference to FIG. 2, the inner surface of gasket 28, when viewed in cross-section, defines a substantially U-shaped channel having a flat upper surface 28a which merges into inwardly inclined inner lips 28b. The outer surface of gasket 28 includes a flat upper surface 28c which merges into downwardly and outwardly extending sidewalls 28d and then into downwardly and inwardly extending outer lips 28e. While the lubricating composition of the present invention has been found to be safe even in contact with potable water, it is preferred that only the outer surfaces of the gasket, namely upper surface 28C, sidewalls 28d and outer lips 28e, have the lubricating film 29 applied thereto. This is felt to provide an extra measure of environmental safety to insure that the dry lubricating film never comes into contact with the liquid being carried through the coupled pipes.

The gasket lubricant of the present invention comprises a lubricant in a film-forming polymer which holds and maintains the lubricant on the surface of the elastomeric gasket at least sufficiently so as to be substantially in situ during the installation stage. This type of lubricant system allows for a longer life span than that typically obtainable by the use of conventional lubricant systems.

The elastomeric gaskets which can be used in accordance with the present invention are typically made from various synthetic rubbers. Exemplary elastomeric gaskets can be made from EPDM, nitrile rubber, epichlorohydrin, neoprene, silicone and halogenated butyl rubber.

The lubricant employed in the present invention is an aqueous suspension of graphite, soaps or a natural or synthetic wax dispersed in a film-forming polymer, with waxes being preferred.

Suitable waxes include natural waxes, such as beeswax, spermaceti, carnauba wax, candelilla wax, montan wax, ozocerite wax (ceresin wax), microcrystalline waxes, paraffin waxes and petrolatum waxes, amongst others; and synthetic waxes, such as long-chain polymers of ethylene, long-chain polymers of ethylene oxide combined with a dihydric alcohol, e.g. polyoxyethylene glycol ("Carbowax"), chlorinated naphthalenes ("Halowaxes"), waxy polyol ether-esters, e.g., polyoxyethylene sorbitol, synthetic hydrocarbon waxes (Fischer-Tropsch waxes), straight-chain wax-like ketones, e.gs., laurone, palmitone and stearone, and cylic ketones, e.g., phenoxyphenyl heptadecyl ketone, amide derivatives of fatty acids, phthalimide waxes, polyoxyethylene fatty acid esters (e.g., "Carbowax 4000 (Mono) Stearate"), amongst others. Paraffin waxes are especially preferred due to their ready availability.

The lubricant, e.g. wax, is dispersed in an effective film-forming amount of a water-miscible polymer comprising an ether of a polypropylene glycol. Preferred polypropylene glycol ethers for use in the practice of the present invention are monoalkyl ethers of tripropylene glycol, with the use of tripropylene glycol monomethyl ether being particularly preferred.

While polytetrafluoroethylene (PTFE) does not form as intimate and enduring a bond with the elastomeric gasket of the present invention, when compared with polypropylene glycol ethers, it, too, can be used to advantage to deliver and retain the lubricant on the surfaces of the gasket, albeit for a shorter period of time. An intimate bonding of the lubricant film is not required inasmuch as the primary purpose is lubrication where coating displacement in the installation phase and post-installation may enhance performance.

A lubricating film of the present invention is applied to the gaskets after their manufacture by any of a variety of conventional application methods including spraying, fogging, dipping, sponging, painting, etc. However, it has been found that in order to obtain a uniform and consistent film coating of about 1 mil in thickness, it is preferable to apply the lubricant by means of high volume, low pressure (HVLP) spraying equipment. Uniform application is insured by placing the gaskets on a positioning belt and then employing a plurality of spray nozzles which emit an airborne mist which can apply a 1 mil film coating. Thereafter, in order to insure that the wax containing polymeric film is properly dried, air is directed at the gaskets having a wet film on their surface.

Thereafter, the gaskets are removed from the belt and can be dried still further by heated air to complete the drying process. Completion of the curing of the polymer and its bonding to the elastomeric gasket in the form of a dry bonded film can be achieved by maintaining the gasket at ambient temperature for about 14 days. Curing and bonding can be accelerated, if desired, by subjecting the partially dried film to a temperature of about 150° F. for about 20 to about 35 minutes which is sufficient to complete the curing of the polymer.

While the gaskets in accordance with the present invention can be shipped to the installation site without need of further protection, it may be advantageous to package them in a protective environment, such as a clear plastic shrink wrap which is the subject of patent application Ser. No. 09/162,954, filed Sep. 29, 1998, the disclosure of which is incorporated herein by reference and which is assigned to the assignee of the present invention.

It has also been determined that FDA approved dyes and pigments can safely and effectively be added to the lubricant in order to color-code the gaskets so that the nature of the elastomer employed in the gasket can be readily identified. For instance, a yellow dye might be used to identify a gasket made with nitrile rubber, while a blue dye might be used to identify a gasket made with EPDM. Alternatively, the colorant in the lubricant could also function to denote the service rating of the gasket, i.e., green, for example, would signify gaskets having high temperature applications, while red would denote gaskets designed for use at low temperatures.

Elastomeric gaskets having a dry lubricating film deposited thereon in accordance with the present invention are, once they are dried, stable in water. It has been determined that pre-lubricated gaskets in accordance with the present invention meet NSF Standard 14 as being completely safe for the passage of potable water through pipes coupled with such gaskets. Further, once the lubricant is applied to the gasket, it will not run or seep out, as is the case with conventional gasket lubricants. Thus, plant personnel are provided with visible assurance and a high level of confidence that the gaskets are functioning properly and are providing sustained and continuous lubrication.

EXAMPLE

Onto a positioning belt holding elastomeric gaskets made from nitrile rubber there was discharged from multiple spray nozzles maintained at a constant pressure an air-borne wet mist of a lubricant identified as EXP W 122 U made by Coatings for Industry, Inc. of Souderton, Pa., sufficient to apply a uniform one (1) mil wet coating onto the surface of each gasket. The gaskets were initially dried with air jets at ambient temperature. Thereafter, the gaskets were allowed to dry at ambient temperature for 14 days to complete the curing of the lubricating film to the surface of the gaskets.

What is claimed is:

1. A pipe coupling for surrounding a pipe in sealed engagement therewith, said pipe coupling comprising a body having an annular configuration which defines an internal gasket seat for receiving an annular shaped elastomeric gasket configured and dimensioned for cooperative engagement with said internal gasket seat, said elastomeric gasket having an inner surface and an outer surface, said inner gasket surface defining in cross section a generally U-shaped channel having a substantially flat upper peripheral surface portion (28a) and inwardly and downwardly inclined inner lip portions (28b) extending therefrom, said outer gasket surface defining in cross section a generally flat upper peripheral surface portion (28c), generally downwardly and outwardly extending side wall portions (28d), and generally downwardly and inwardly extending outer lip portions (28e), a dry lubricating film comprising a lubricant in a film-forming polymer adhered only to said outer surface portions of said gasket, said inner surface portions of said gasket being devoid of said film-forming polymer.

2. The pipe coupling of claim 1 wherein the lubricant is selected from the group consisting of graphite, soaps and natural or synthetic waxes.

3. The pipe coupling of claim 1 wherein the wax is selected from the group consisting of paraffinic waxes, ethylenic polymeric waxes, chlorinated naphthalene and microcrystalline waxes.

4. The pipe coupling of claim 1 wherein the elastomer forming the elastomeric gasket is selected from the group consisting of EPDM, nitrile rubber, epichlorohydrin, neoprene, silicone rubber and halogenated butyl rubber.

5. The pipe coupling of claim 1 wherein the film-forming polymer is a polypropylene glycol ether.

6. A sealing device for providing a fluid pressure-tight joint between stationary parts, which comprises:

(a) an annular-shaped elastomeric gasket having an inner surface and an outer surface, (b) said inner gasket surface defining in cross-section a generally U-shaped channel having a substantially flat upper peripheral surface portion (28a) and inwardly and downwardly extending inner lip portions (28b) extending therefrom, (c) said outer gasket surface defining in cross-section a generally flat upper peripheral surface (28c), generally downwardly and outwardly extending side wall portions (28d), and generally downwardly and inwardly extending outer lip portions (28e), (d) a dry lubricating film (29) comprised of a lubricant and a film-forming polymer adhered only to the outer surface portions of said gasket, said inner surface portions of said gasket being devoid of said film-forming polymer.

7. The sealing device of claim 6 wherein the lubricant is selected from the group consisting of graphite, soaps and natural or synthetic waxes.

8. The sealing device of claim 6 wherein the wax is selected from the group consisting of paraffinic waxes, ethylenic polymeric waxes, chlorinated naphthalene and microcrystalline waxes.

9. The sealing device of claim 6 wherein the film-forming polymer is a polypropylene glycol ether.

10. The sealing device of claim 6 wherein the elastomeric gasket is positioned within a pipe coupling at the juncture of two pipe ends.

* * * * *